United States Patent [15] 3,701,964

Cronin [45] Oct. 31, 1972

[54] FLAT CABLE ELECTRICAL WIRING SYSTEM

[72] Inventor: Michael J. Cronin, Sherman Oaks, Calif.

[73] Assignee: Lockheed Aircraft Corporation, Burbank, Calif.

[22] Filed: Sept. 4, 1970

[21] Appl. No.: 69,555

[52] U.S. Cl. .............339/17 F, 339/17 M, 339/18 C, 339/63 M, 339/94 M, 339/99 R, 339/103 M, 339/176 MF, 339/277 R

[51] Int. Cl. .........H01b 7/08, H01r 29/00, H05k 1/04

[58] Field of Search .......339/17 R, 17 F, 17 L, 17 M, 339/17 N, 18 R, 18 B, 18 C, 59 R, 59 M, 60 M, 61 M, 65, 66, 75 R, 75 MP, 176 M, 176 MP, 176 MF, 75 M, 92, 150; 174/68.5; 317/101, 99

[56] References Cited

UNITED STATES PATENTS

| | | | |
|---|---|---|---|
| 3,177,458 | 4/1965 | Buchanan | 339/99 |
| 3,189,863 | 6/1965 | Leach | 339/17 F |
| 1,361,426 | 12/1920 | White | 339/122 F X |
| 3,345,599 | 10/1967 | Henschen et al. | 339/18 C |
| 3,016,512 | 1/1962 | Borchard | 339/277 X |

OTHER PUBLICATIONS

Article From Electronic Design Magazine, Oct. 28, 1959, pgs. 36– 39, " Making the Most of Flat Cables," BY G. E. Smith & Wm. Richter.

*Primary Examiner*—Marvin A. Champion
*Assistant Examiner*—Terrell P. Lewis
*Attorney*—George C. Sullivan and Ralph M. Flygare

[57] ABSTRACT

A flat cable electrical wiring system including a number of flat electrical cables and a terminal junction assembly electrically connecting selected cable conductors. The terminal junction assembly has a terminal board mounting projecting electrically isolated terminal pins receiving apertured terminals on the cable conductors and retaining means for retaining the terminals on the terminal pins. Two cable configurations are disclosed, one having flat conductors whose terminals are attached in a fixed geometric pattern directly to one end of the flat cable sheath and the other having round conductors whose terminal ends extend beyond the ends of the cable sheath. A variety of terminal junction assemblies are disclosed including one in which selected cable conductors are electrically connected by a flexible programmable circuit member or plug having terminal pins engaging elements electrically connected by programmable circuit means in a manner which permits wiring changes without major modification of the basic wiring system by substitution of one program circuit member for another. In another disclosed terminal junction assembly, selected cable conductors are electrically connected by engagement of their terminals over common terminal pins. The junction assemblies may be arranged for electrical interconnection of flat-to-flat or flat-to-round conductor cables, electrical interconnection of flat cable and existing conventional wiring systems, and for testing and monitoring of the individual wiring circuits entering the junction.

20 Claims, 11 Drawing Figures

MICHAEL J CRONIN
INVENTOR.
BY George C. Sullivan
Ralph M. Flygare
AGENTS

MICHAEL J. CRONIN
INVENTOR.
George C. Sullivan
BY Ralph M. Flygare
AGENTS

MICHAEL J. CRONIN
INVENTOR.
George C. Sullivan
BY Ralph M. Flygare
AGENTS

MICHAEL J. CRONIN
INVENTOR.

George C. Sullivan
BY Ralph M. Flygare
AGENTS

MICHAEL J. CRONIN
INVENTOR.
George C. Sullivan
BY Ralph M. Flygare
AGENTS

FLAT CABLE ELECTRICAL WIRING SYSTEM

BACKGROUND OF THE INVENTION

Field of the Invention

This invention relates generally to electrical wiring systems and more particularly to a flat cable electrical wiring system.

Prior Art

A relatively recent innovation in the field of electrical wiring systems is the so-called flat electrical cable, referred to also as a tape cable. Such a flat cable has a relatively thin flat strip-like sheath of plastic or other suitable electrical insulating material containing a group of electrical conductors arranged side by side. Each conductor has exposed end terminals at the ends of the sheath through which electrical contact is made with the conductor. Flat cables of this kind have two basic forms referred to as flat conductor-flat cable and round conductor-flat cable. As the name implies, a flat conductor-flat cable has electrical conductors in the form of thin metal strips of rectangular cross section. Similarly, a round conductor-flat cable comprises a plurality of insulated electrical conductors of circular cross section, in a contiguous side-by-side arrangement.

Flat electrical cables have many advantages over conventional round cables. These advantages are well known to those versed in the art and need not be repeated here. Suffice it to say that flat cable electrical wiring systems are gaining wide-spread use in many installations, particularly aircraft wiring installations. In many of these applications, the adoption of a flat-cable wiring system requires the utilization of a total-system concept consisting of appropriate component assemblies, such as specialized terminal junctions, to provide effective interfaces between the flat-cable system and the existing equipment and wiring systems. Another requirement which a flat cable wiring system must satisfy, particularly in the aircraft installations, is the capability of monitoring, testing and re-routing wiring circuits.

SUMMARY OF THE INVENTION

The present invention provides a flat-cable electrical wiring system, and component assemblies therefor, which satisfies the above-stated system requirements. According to one of its aspects, the invention provides a wiring system including a number of flat electrical cables having apertured terminals at the ends of the cable sheath, and a terminal junction assembly electrically connecting selected cable conductors. This junction assembly includes a terminal board mounting projecting terminal pins (or, in certain embodiments, a socket) over which engage the conductor terminals and retaining means for releasably retaining the conductor terminals on the terminal pins.

Two flat cable configurations are disclosed. One cable configuration is a flat conductor-flat cable wherein the conductor terminals are attached, in a fixed geometric arrangement matching the corresponding terminal pin arrangement, directly to the flat ends of the cable sheath. The terminal pin receiving holes in the conductor terminals open through the sheath ends to permit placement of the terminals over the terminal pins. The other cable configuration is a round conductor-flat cable wherein the terminal ends of the cable conductors extend a distance beyond the ends of the cable sheath for independent positioning of the conductor terminals over the terminal pins.

A variety of terminal junction configurations are disclosed. One disclosed junction configuration is a programmable terminal junction assembly for trunk-type wiring systems. This junction assembly has a circuit board overlying the terminal board and mounting sockets receiving the terminal pins. The "circuit board" may comprise either a flexible or rigid insulating sheet which is provided with programmable circuit conductor means which electrically connect selected sockets and, thereby, the corresponding terminal pins and cable conductors. The junction retaining means clamps the terminal and circuit boards together with the cable conductor terminals positioned between the boards in such a way that the terminals and terminal pins are firmly retained in electrical contact. This form of terminal junction assembly permits wiring changes without major modification of the basic wiring system by substitution of one circuit board for another.

Another disclosed terminal junction configuration is a multi-way distribution junction assembly or "splitter". In this terminal junction assembly, selected conductors of the several cables entering the junction are electrically connected by placement of their terminals over common terminal pins of the terminal board. By way of example, the terminal junction assembly may be arranged to electrically connect selected conductors of a first-entering cable to the conductors of a second-entering cable and other conductors of the first cable to the conductors of a third-entering cable. The junction assemblies may be arranged for electrical interconnection of flat-to-flat or flat-to-round flat cables as well as electrical interconnection of flat cable and existing conventional wiring systems and for testing and monitoring of the individual wire circuits entering the junction.

DESCRIPTION OF THE PREFERRED EMBODIMENT

Figure 1:
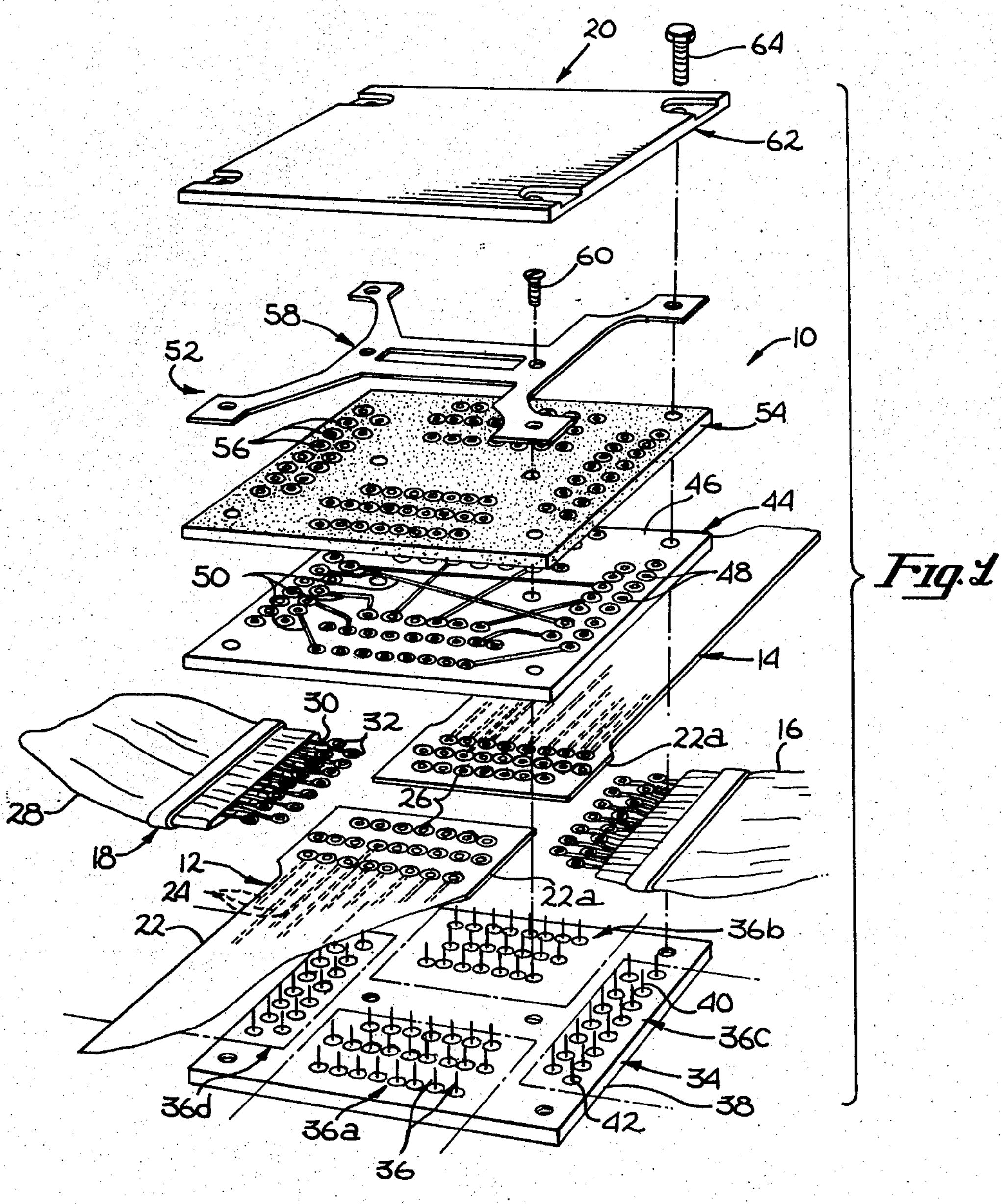
FIG. 1 is an exploded view of a flat cable wiring system according to the invention.
Figure 2:
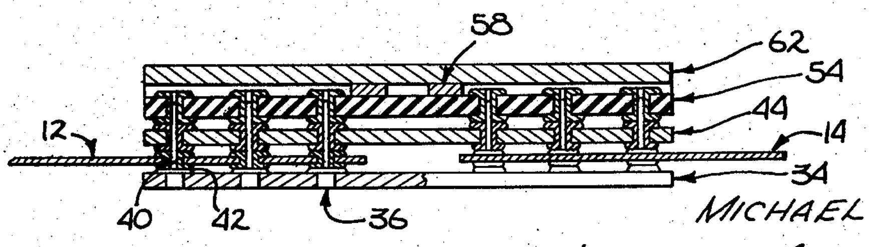
FIG. 2 is a section through the assembled wiring system.

Turning first to FIGS. 1 and 2, there is illustrated a flat cable electrical wiring system 10 according to the invention including four flat electrical cables 12, 14, 16 and 18 and a terminal junction assembly 20. Cables 12 and 14 are flat conductor-flat cables. Cables 16 and 18 are round conductor-flat cables. Each cable 12, 14 has a relatively thin flat strip-like sheath 22 of plastic or other electrical insulating material containing a group of thin flat strip-like conductors 24 arranged side by side. Each flat conductor has an apertured end terminal 26 at each end. Each end 22*a* of the sheath 22 of each cable 12, 14 is laterally enlarged to allow passage through the terminal pins/sockets in the terminal junction assembly. The conductor terminals 26 of each cable 12, 14 are attached, in a fixed printed-circuit arrangement, directly to the ends 22*a* of the cable sheath in a manner such that the terminal holes open through the sheath ends, as shown.

Each flat cable 16, 18 has a relatively thin flat strip-like sheath 28 of plastic or other electrical insulating material containing a group of round conductors 30 arranged side-by-side. Each conductor 30 has an apertured terminal 32 at each end. The terminal ends of the conductors 30 extend beyond the ends of the cable sheath 28, as shown, whereby the conductor terminals 32 are independently positionable. However, it is significant to note that the extending conductor ends have different lengths such that the conductor terminals tend to assume a particular geometric arrangement.

Terminal junction assembly 20 has a rectangular terminal board 34 mounting a set of projecting terminal pins 36. The base member 38 of the terminal board is constructed of an electrical insulating material, and the terminal pins 36 are spaced from one another. Accordingly, these pins are electrically isolated from one another. Each terminal pin 36 has a stem 40 surrounded at its base by a flange 42 which seats against the base member 38. While the illustrated terminal board 34 has terminal pins on only one side, it will become evident that both sides of the board may be provided with pins. In this case, the terminal pins on one side of the board will be electrically isolated from the terminal pins on the opposite side of the board.

While the embodiment shown in FIGS. 1 and 2 employs projecting pins 36, it is to be understood that such pins may be replaced with pin-receiving sockets if desired.

In the particular junction assembly 20 illustrated, the set of terminal pins 36 are arranged in four groups 36*a*, 36*b*, 36*c* and 36*d* along the four edges of the base member 38. The two flat cables 12, 14 extend from the two opposite edges of the terminal board 34 mounting the terminal pin groups 36*a*, 36*b*. The conductor terminals 26 of each latter cable engage over the adjacent group of terminal pins 36, as shown. In this regard, it will be observed that the fixed geometric arrangement of the conductor terminals 26 of each cable 12, 14 matches the geometric arrangement of the terminal pins of the adjacent pin group, such that the terminals may be engaged over the pins in the manner shown. The two flat cables 16, 18 extend from the two opposite edges of the terminal board 34 mounting the terminal pin groups 36*c*, 36*d*. The conductor terminals 32 of each latter cable engage over the adjacent group of terminal pins 36, as shown. In this regard, it will be observed that the latter terminals have a general geometric arrangement matching those of the adjacent pin groups. However, unlike the fixed terminals of cables 12, 14, the terminals of cables 16, 18 are independently positionable for engagement over the terminal pins.

It should be understood that the four-sided geometry of the terminal junction assembly 20 is exemplary only, and may be readily modified to provide a lesser or greater number of cable interfaces. Also, the particular combination of cable types shown and described is merely exemplary and may be altered in as many permutations as is appropriate to a given application.

The terminal junction assembly 20 electrically interconnects selected conductors 24, 30 of the four flat cables 12, 14, 16, 18. In this particular junction assembly, such selective interconnection of the conductors is accomplished by a programmable circuit member 44. This member may be constructed of either a rigid or flexible material. To this end, the program circuit has a rectangular configuration 46 of electrical insulating material enclosing a set of electrically conductive apertured terminal pads 48 equal in number to the terminal pins 36. The program member 46 has approximately the same size and shape as the terminal board base member 38 and the sockets 48 are arranged to mate with the terminal pins 36. After the cable conductor terminals 26, 32 have been placed over the terminal pins 36, the program circuit member 44 is placed over the terminal board 34 in such a way that the terminal pins enter the apertured terminal pads 48. Program circuit member 44 is provided with printed circuit conductors 50 which electrically interconnects selected sockets 48 and, thereby, the corresponding terminal pins 36 and cable conductors 24, 30.

Terminal junction assembly 20 is equipped with retaining means 52 for retaining the cable conductor terminals 26, 32 on and in firm electrical contact with the terminal pins 36 by clamping the terminal board 34 and circuit member 44 tightly together. Retaining means 52 comprises a relatively firm resilient compression pad 54 of hard rubber or the like having the same rectangular shape and size as the terminal board 34 and circuit member 44. This pad mounts electrically conductive terminal pin sockets 56 equal in number to and arranged in the same manner as the terminal pins 36 and circuit member terminal pads 48. Compression pad 54 is placed on top of the circuit member 44 in a manner such that the terminal pins 36 project into the pad sockets 56. In this regard, it will be observed that the length of the terminal pins exceeds the thickness of the circuit board, such that the pins project beyond the circuit board for engagement in the compression pad sockets.

Overlying the compression pad 54 is a retainer plate 58. This plate is attached to the base member 38 of the terminal board 34 by screws 60 which extend through clearance holes in the compression pad and program circuit member 46. It is significant to observe that the retainer plate has a skeleton structure which is shaped to avoid shorting contact of the plate with the compression pad sockets 56. Retainer plate screws 60 are tightened to firmly clamp together the terminal board 34, circuit member 44, and compression pad 54. The cable conductor terminals 26, 32, which are interposed between the terminal and circuit boards, are thereby urged into firm electrical contact with the terminal pin base flanges 42. The terminal junction assembly 20 is completed by a cover plate 62 which is fastened by screws 64 to the retainer plate 58.

The illustrated terminal junction assembly 20 has numerous unique features and advantages. Thus, wiring changes may be made without major modification of the basic wiring system by merely substituting one programmed flexible or rigid circuit member 44 for another. This feature has a distinct advantage in aircraft wiring systems since any wiring changes which are necessitated in an aircraft in service as a consequence of the addition, removal, or change of wiring circuits may be accomplished by producing the properly programmed circuit member and distributing the latter to the current location of the aircraft.

Another feature of the illustrated terminal junction assembly 20 resides in its adaptability to checking and monitoring of individual wire circuits. Thus, when the circuit board 44 is removed, all circuits are isolated from one another and exposed for complete check-out. This, then, is an important maintenance feature. On the other hand, removal of the junction cover 62 exposes the compression pad sockets 56 for engagement by probes of circuit monitoring instruments. Also, wire jumpers or "patch cords" may be installed as a semi-permanent program circuit in lieu of fixed program member, such as may be desired during development, testing, or maintenance procedures.

It will be understood that while the illustrated wiring system has two flat conductor and two round conductor flat cables, a present flat cable wiring system may embody any number of cables in any desired mix of flat and round conductor cables, as well as all flat conductor or all round conductor cables. In this regard, it is significant to recall that both sides of the terminal board 34 may mount terminal pins 36 for receiving cable conductor terminals. It will be understood that in this case, each side of the board will be provided with a programmed circuit member 44, compression pad 54, retainer plate 58, and cover 62.

Figure 3:
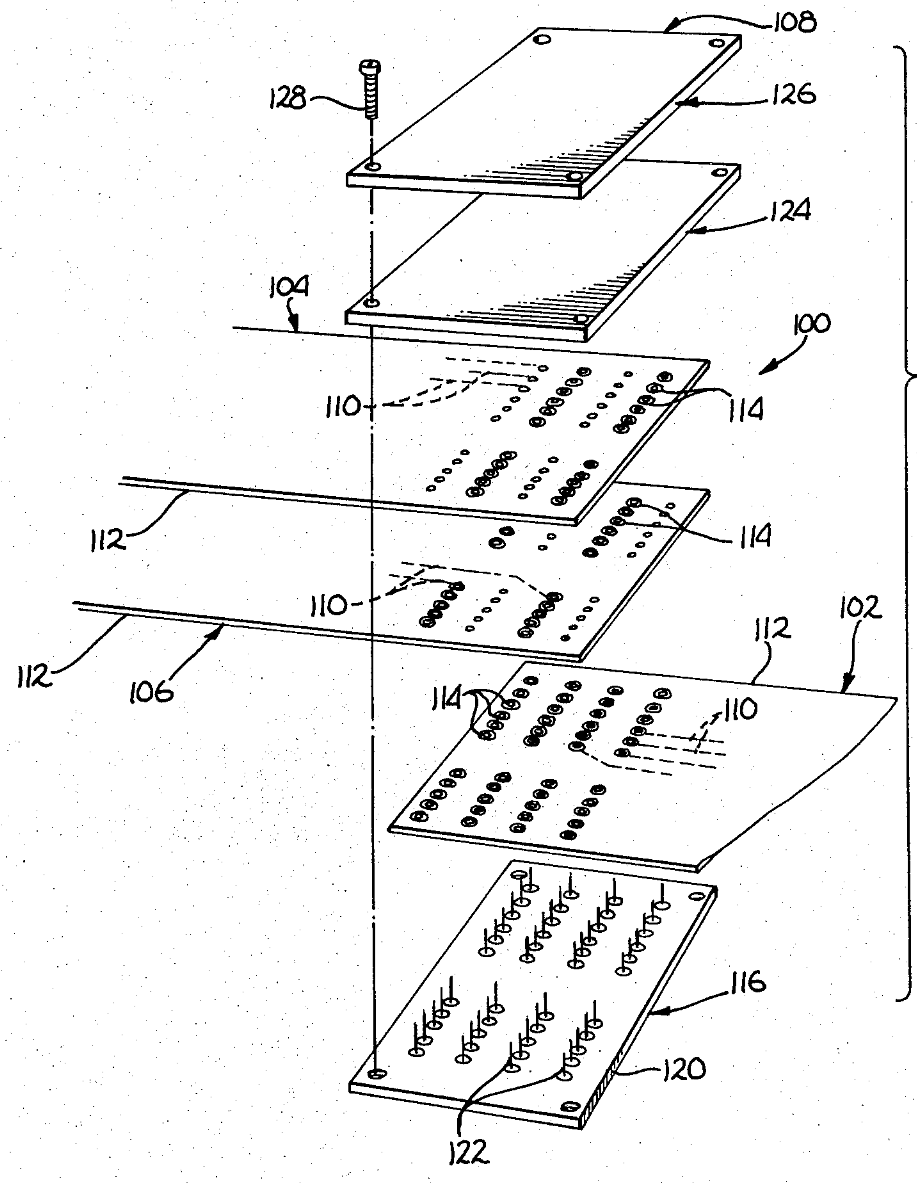
FIG. 3 is an exploded view through a modified flat cable wiring system according to the invention.
Figure 4:
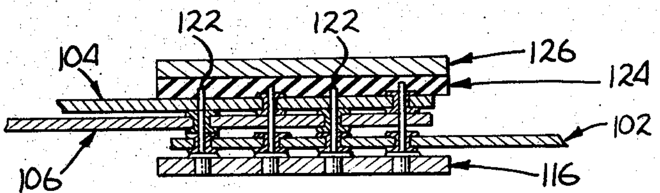
FIG. 4 is a section through the modified wiring system of FIG. 3.

Turning next to FIGS. 3 and 4, there is illustrated a flat-cable electrical wiring system 100 including three flat electrical cables 102, 104, 106 and a terminal junction assembly 108. The cables 102, 104, 106 are all shown to be flat conductor-flat cables which are substantially identical to the earlier described cables 12, 14. Each cable has conductors 110 within a flat sheath 112 provided with apertured pad terminals 114 which are attached directly to the flat ends of the sheath in such a way that the terminal holes open through the sheath.

Terminal junction assembly 108 is designed to electrically connect certain conductors 110 of cable 102 to the conductors of cable 104 and other conductors of cable 102 to the conductors of cable 106. To this end, the terminal assembly comprises a terminal board 116 including a base member 120 of electrical insulating material mounting a set of electrically isolated terminal pins 122 similar to terminal pins 36. The conductor terminal pads 114 of cable 102 and the terminal pins 122 are equal in number and have the same geometric arrangement to permit engagement of the latter conductor terminals over all the terminal pins, as shown.

The conductor terminal pads 114 of cables 104, 106 are equal in number to and are arranged to engage over different selected groups of the terminal pins 122. In the particular wiring system illustrated, for example, the terminal pins 122 are arranged in four rows. The conductor terminal pads of cable 104 are arranged to engage over two alternate rows of pins, and the conductor terminal pads of cable 106 are arranged to engage over the two intervening rows of pins. Each cable sheath 112 is apertured to receive the intervening rows of pins, as shown. From this description, it will be understood that the conductor terminal pads of of cable 104 and one group of the conductor terminal pads of cable 102 engage over one group of common terminal pins 122, whereby the corresponding cable conductors are electrically connected. Similarly, the conductor terminal pads of cable 106 and another group of the conductor terminal pads of cable 102 engage over another group of common terminal pins, whereby the corresponding cable conductors are electrically connected. By appropriate geometric arrangement of the terminal pads in cables 104 and 106, many viable configurations of cable splitters can be provided.

Overlying the terminal board 116 is a relatively firm resilient compression pad 124. In this instance, the compression pad has no terminal pin sockets and the terminal pins 122 are dimensioned to just project through the cable conductor terminal pads 114. The compression pad 124 is compressed against the terminal board 116 by a cover 126 attached to the board by screws 128. The conductor terminal pads 114 are thereby retained in firm electrical contact with the terminal pins 122 as in the first form of the invention. While the compression pad 124 is devoid of terminal pin sockets, it will be understood that such sockets may be provided on the pad for the reasons stated earlier. The terminal pins 122 may also be replaced by hollow terminal pins, having internal spring contacts, to serve the same advantages previously described, as will be apparent to those versed in the art.

Figure 5:
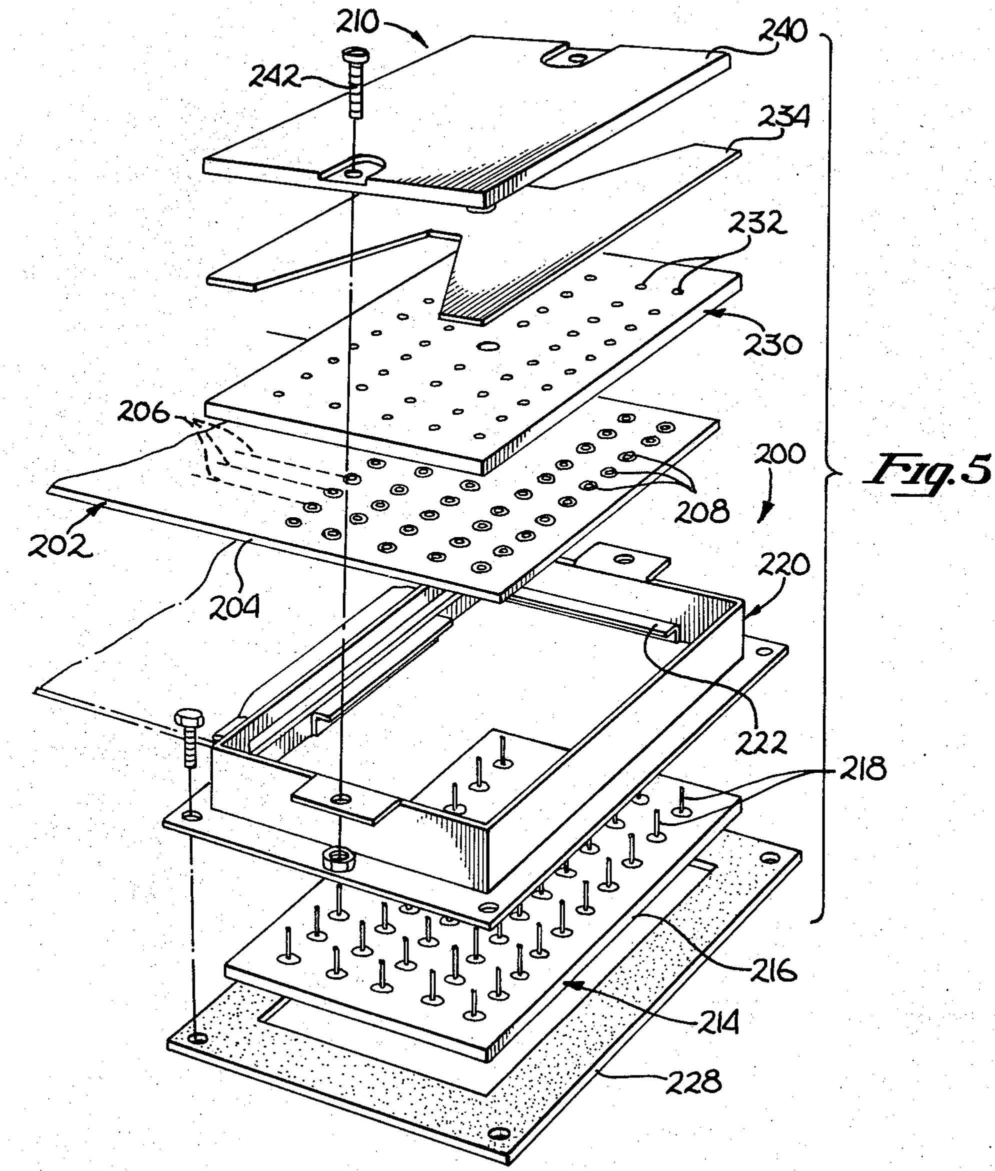
FIG. 5 is an exploded view through a flat cable wiring system according to the invention for interfacing with a conventional wiring system.
Figure 6:
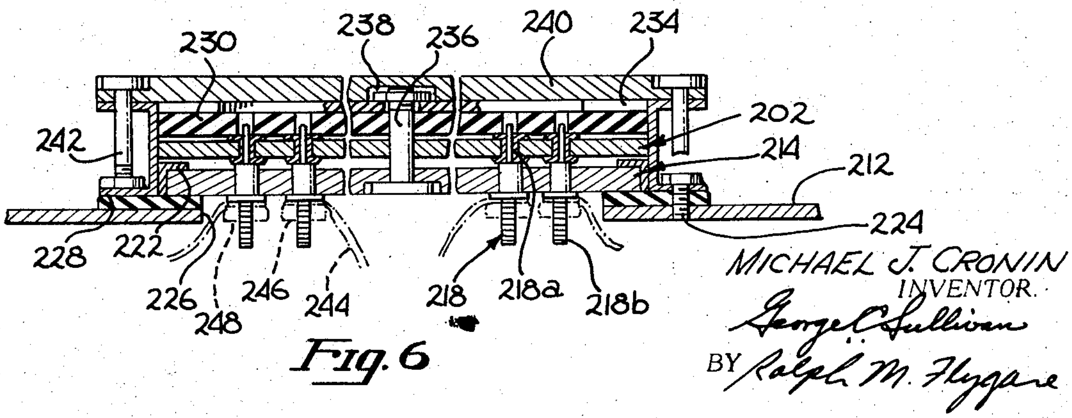
FIG. 6 is a section through the assembled wiring system of FIG. 5.

FIGS. 5 and 6 illustrate a modified flat-cable wiring system 200 according to the invention which is designed to interface with a conventional wiring system. This modified wiring system may be utilized to electrically interconnect any number of flat electrical cables with a conventional wiring system. For convenience, only a single flat cable 202 is illustrated. This flat cable has a flat sheath 204 containing a group of flat conductors 206 whose apertured terminal pads 208 are attached directly to the ends of the sheath, as in the earlier described flat conductor cables.

In addition to the flat cable 202, the wiring system 200 has a terminal junction assembly 210 which is shown to be mounted on an aircraft firewall 212. Junction assembly 210 includes a terminal board 214 having a base member 216 of electrical insulating material mounting a set of electrically isolated terminal pins 218. In this instance, the terminal pins project through and beyond opposite sides of the terminal board base member. The projecting pin ends **218*a* at one side of the terminal board provide flat cable terminal pins similar to those in the earlier described terminal boards. The projecting pin ends 218*b*** at the opposite side of the terminal board are threaded to provide terminal pins for conventional wiring.

Terminal board 214 is surrounded by a mounting frame 220 having flanges 222 which overlie edge portions of the terminal board base member 216. Frame 220 is attached to the firewall 212 by bolts 224 over an opening 226 in the wall in such a way that the edge portions of the base member seat against the wall about the opening and are clamped between the wall and the frame flanges 222. A gasket 228 is interposed between the wall and base member. Terminal board 24 is positioned in the frame so that its flat cable terminals 218*a* project outwardly away from the firewall and the conventional wiring terminals 218*b* project through the wall opening 226.

As in the earlier wiring systems of the invention, the flat cable conductor terminal pads 208 have a fixed geometric arrangement matching that of the flat cable terminal pins 218*a*. The conductor terminals are engaged over the latter pins, as shown. Conductor terminal pads 208 are retained on the terminal pins 218*a* by a relatively firm resilient compression pad 230 having electrically conductive sockets 232 receiving the protruding ends of the pins. Compression pad 230 is urged against the terminal board, to retain the conductor terminals 208 in firm electrical contact with the base flanges of terminal pins 218*a*, by a retainer plate 234 secured to the terminal board by a bolt 236. The head of this bolt seats against the rear side of the terminal board and its shank extends through the board, compression pad and retainer plate. A nut 238 threaded on the shank retains the parts in assembled relation. Overlying the retainer plate is a cover 240 which is fastened to the frame 220 by bolts 242.

As noted earlier, the illustrated flat cable wiring system is designed to interface with a conventional wiring system. This conventional wiring system includes conductors 244 having end terminals 246 which are engaged over the threaded terminal pins 218*b*. Terminals 246 are retained on the terminal pins 218*b* by nuts 248. Programming or changing the electrical relationships of the round to the flat wiring can be accomplished via the connection of the round wires to the threaded terminal pins 218*b*.

The wiring system 200 obviously possesses the advantages of the earlier described flat cable wiring systems, i.e., adaptability to checking and monitoring of the individual wiring circuits.

Figures 7, 8, 9:
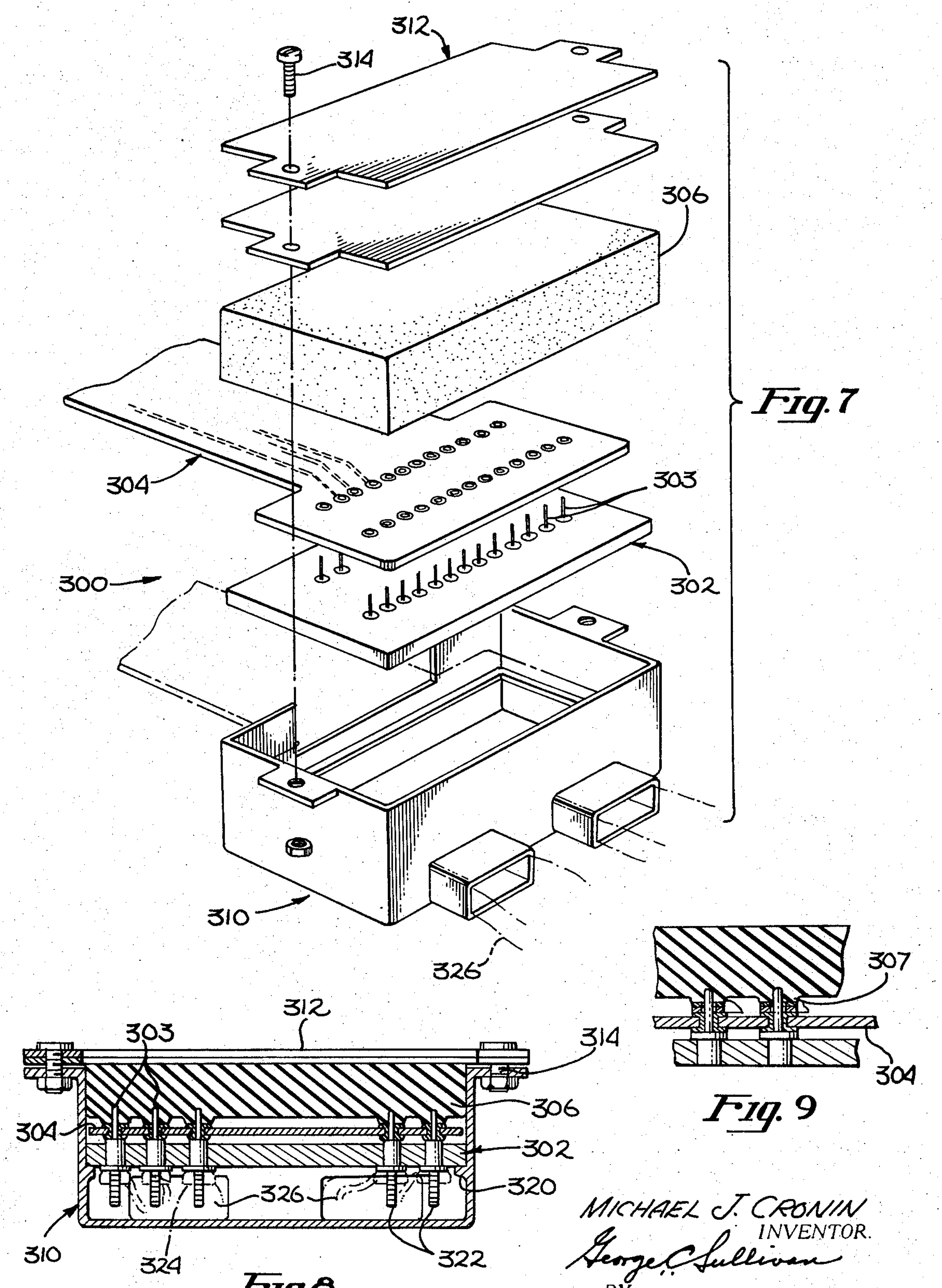
FIG. 7 is an exploded view of a modified flat cable wiring system for interfacing with a conventional wiring system.
FIG. 8 is a section through the assembled wiring system in FIG. 7.
FIG. 9 is a fragmentary enlargement of a portion of FIG. 8.

FIGS. 7–9 illustrate a modified flat cable wiring system 300 for interfacing with a conventional wiring system. This modified wiring system has a terminal board 302 with upper flat cable terminal pins 303, a flat electrical cable 304, and a compression pad 306 similar to and assembled in the same manner as those of wiring system 200 except that it has no terminal pin sockets. Also, pad 306 has lower shoulder faces 307 about terminal pins 303 which press against the cable terminals. Terminal board 302, the terminal end of cable 304 and compression pad 306 are contained within a hollow junction box 310 having a cover 312 fastened to the box by screws 314. The terminal end of the flat cable is laterally enlarged to ease passage of conductors through terminal pins 303. The terminal board base member 318 rests on a shoulder 320 within the junction box 310. The circuit board 302, cable 304, and compression pad 306 are firmly clamped between box cover 312 and shoulder 320. The lower threaded conventional wiring ends or studs 322 of the terminal pins 303 are spaced from the bottom wall of the junction box 310, thus to permit engagement over the studs of the terminals 324 of the conventional wiring 326. The flat cable 304 and conventional wiring 326 enters the junction box through suitable openings, as shown.

Figure 10:
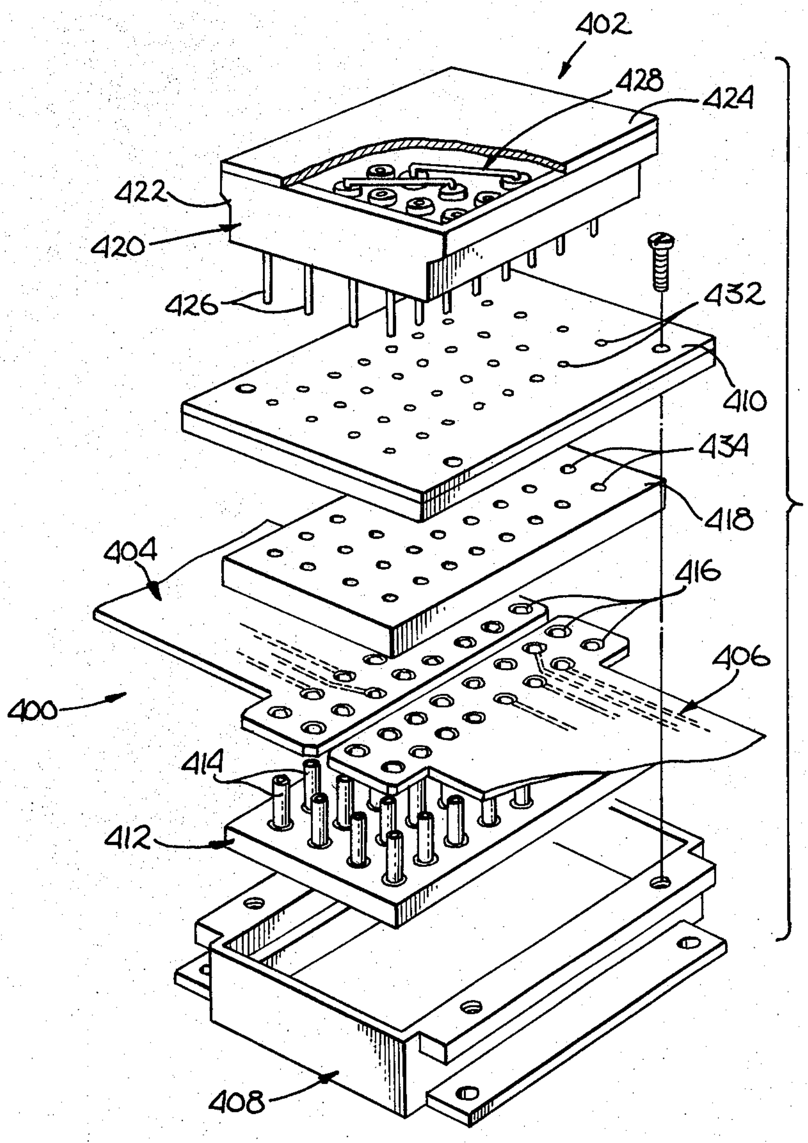
FIG. 10 is an exploded view of a modified programmable flat cable wiring system according to the invention.
Figure 11:
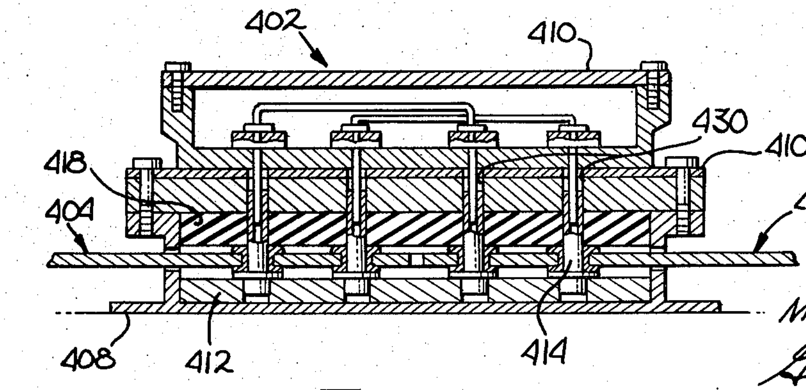
FIG. 11 is a section through the assembled wiring system in FIG. 10.

Turning to FIGS. 10 and 11, there is illustrated a modified flat wiring system 400 including a programmable terminal junction assembly 402 for electrically connecting selected conductors of flat cables 404, 406 entering the junction assembly. Junction assembly 402 has a junction box 408 having a cover 410 and side openings through which the terminal ends of cables 404, 406 enter the box. These cable ends are laterally enlarged to ease routing of the conductors. Within the terminal box 408 is a terminal board 412 with flanged terminal pins 414 over which the cable conductor terminals 416 engage. A compression pad 418 is placed between the junction box cover 410 and terminal board 412 for retaining the conductor terminals 416 in firm electrical contact with the terminal pins 414.

Terminal junction assembly 402 has an external circuit board in the form of a programming plug 420. This programming plug includes a housing 422 with a removable cover 424 and mounting programming pins 426 which project through the bottom wall of the housing. Selected pins 426 are electrically connected within the housing 422 by programmable circuit means 428. In this instance, the circuit means comprise jumper wires which are secured to the pins 426 in a manner such that the wires may be shifted from pin to pin to change the programmed electrical connections of the plug 420 by removal of the housing cover 424. If desired, however, other types of programmable circuit means may be employed, such as replaceable printed circuits.

The programming plug 420 is adapted for insertion into the junction box 408 to electrically connect selected terminal pins 414 and thereby the corresponding flat cable conductors. To this end, the terminal pins 414 have sockets 430 for receiving the plug pins 426 and the junction box cover 410 and compression pad 418 have openings 432, 434 through which the plug pins may enter the terminal pin sockets, as shown. This externally programmed terminal junction assembly has all of the advantages of the earlier described programmable junction assembly and the additional advantage that the junction wiring program may be changed by merely changing programming plugs, or the programming circuit means of the plug, without disassembling the terminal junction box 408. Moreover, when the programming plug is removed, the terminal pins 414 are accessible for circuit check-out.

What is claimed is:

1. A flat-cable electrical wiring system comprising:

first and second flat multiconductor electrical cables wherein the electrical conductors of each of said cables are disposed in side-by-side relationship and have apertured terminal means on the ends thereof;

a terminal board mounting a set of projecting terminal pins engaging said conductor terminal means, the conductor terminal means of said first flat cable being engaged over a first group of said terminal pins and the conductor terminal means of said second flat cable being engaged over a second group of said terminal pins;

an interchangeable programmable circuit means mounting a first group of electrically conductive elements engaging said first group of terminal pins and a second group of electrically conductive elements engaging said second group of terminal pins;

circuit conductor means electrically connecting selected elements of said element groups; and, retaining means releasably retaining said terminal means on said terminal pins.

2. A flat-cable electrical wiring system as defined in claim 1 including:

a third flat cable having conductor terminal means engageable over the terminal pins of both said pin groups in a manner such that the conductors of said first cable are electrically connected to certain conductors of said third cable and the conductors of said second cable are electrically connected to other conductors of said third cable.

3. A flat cable electrical wiring system as defined in claim 1 wherein:

said retaining means comprises a relatively firm resilient compression pad overlying said terminal board, and means for pressing said pad toward said terminal board to retain said conductor terminal means in firm electrical contact with said terminal pins.

4. A flat cable electrical wiring system as defined in claim 3 wherein:

said compression pad includes electrically conductive sockets receiving said terminal pins, and said sockets are exposed at the outer side of said pad to provide terminal connections for external circuit monitoring instruments.

5. A flat-cable electrical wiring system as defined in claim 3 wherein:

said programmable circuit means comprises a programmed circuit member between said terminal board and said compression pad for electrically interconnecting selected terminal pins, said cable conductor terminals are disposed between said programmed circuit member and said compression pad so that said programmed circuit member is urged toward said terminal board to retain said conductor terminals in firm electrical contact with said terminal pins.

6. A flat cable electrical wiring system as defined in claim 5 wherein:

said terminal pins extend through and beyond the side of said programmed circuit member remote from said terminal board; and, said compression pad includes electrically conductive sockets receiving the extending ends of said terminal pins and providing terminals for external circuit monitoring means.

7. A flat cable electrical wiring system as defined in claim 3 wherein:

said compression pad seats directly against said terminal board and cable conductor terminals for retaining the latter in firm electrical contact with said terminal pins.

8. A flat cable electrical wiring system as defined in claim 15 wherein:

the side of said compression pad facing said terminal board has projecting annular shoulders about said terminal pins which bear against said cable conductor terminal means and provide intervening clearance spaces for conventional wiring having terminals engageable over said terminal pins.

9. A flat-cable electrical wiring system comprising:

first and second flat multiconductor electrical cables wherein the electrical conductors of each of said cables are disposed in side-by-side relationship and have apertured terminal means on the ends thereof;

a terminal board mounting a set of projecting terminal pins engaging said conductor terminal means, the conductor terminal means of said first flat cable being engaged over a first group of said terminal pins and the conductor terminal means of said second flat cable being engaged over a second group of said terminal pins;

an interchangeable program circuit means mounting a first group of terminal pin sockets receiving said first group of terminal pins and a second group of terminal pin sockets receiving said second group of terminal pins;

circuit conductor means electrically connecting selected sockets of said socket groups; and, junction retaining means for releasably clamping said terminal board and said program circuit means together with said conductor terminals positioned therebetween.

10. A flat-cable electrical wiring system comprising:

first and second flat multiconductor electrical cables wherein the electrical conductors of each of said cables are disposed in side-by-side relationship and have apertured terminal means on the ends thereof;

a terminal board mounting a set of projecting terminal pins engaging said conductor terminal means, the conductor terminal means of said first flat cable being engaged over a first group of said terminal pins and the conductor terminal means of said second flat cable being engaged over a second group of said terminal pins; and, an externally accessible, interchangeable programming plug including a first group of programming pins engaging said first group of terminal pins, a second group of programming pins engaging said second group of terminal pins, and circuit means electrically connecting selected programming pins.

11. A flat-cable electrical wiring system as defined in claim 10 including:

a junction box enclosing said terminal board; and wherein:

said programming plug comprises a housing mounting said programming pins and enclosing said circuit conductor means;

said junction box has wall openings through which said programming pins are insertable to engage said terminal pins; and, said plug housing has a removable cover which is removable to provide access to said circuit conductor means for reprogramming thereof.

12. A flat-cable electrical wiring system for interfacing with a conventional separate, round-conductor, wiring system, comprising:

a flat electrical cable comprising a plurality of ribbon-like electrical conductors disposed in side-by-side relationship, and having apertured terminals on the ends of each of said conductors;

a terminal junction means comprising a terminal board mounting a set of terminal pins which project beyond opposite sides of the board to provide at one side of the board flat cable terminal pins over which engage said cable conductor terminals and at the opposite side of the board, terminal pins for connection to said conventional round-conductor wiring; and, retaining means retaining said cable conductor terminals on said cable terminal pins.

13. A flat cable electrical wiring system as defined in claim 12 wherein:

said cable terminal pins comprise smooth cylindrical pins and said conventional wiring conductor terminal pins comprise threaded studs.

14. A terminal junction assembly for a flat cable wiring system comprising:

a terminal board mounting projecting electrically isolated terminal pins;

a resilient compression pad overlying said terminal board;

means for urging said compression pad into engagement with said terminal board;

a program circuit member interposed between said terminal board and said compression pad;

electrically conductive sockets carried by said program circuit member for receiving said terminal pins; and, circuit means electrically interconnecting selected sockets and corresponding terminal pins.

15. A terminal junction assembly as defined in claim 14 wherein:

said terminal pins extend through and beyond the side of said program circuit member remote from said terminal board; and, said compression pad includes electrically conductive sockets receiving the extending ends of said terminal pins.

16. A terminal junction assembly for a flat cable wiring system comprising:

a terminal board mounting projecting electrically isolated terminal pins; and, a programmable interchangeable circuit means comprising a plurality of electrically conductive elements engaging corresponding terminal pins, and a plurality of circuit conductors electrically interconnecting corresponding elements and terminal pins.

17. A terminal junction assembly as defined in claim 16 wherein:

said conductive elements comprise sockets receiving said terminal pins.

18. A terminal junction assembly as defined in claim 16 wherein:

said interchangeable means comprises a programming plug and said conductive elements comprise projecting pins on said plug engageable with said terminal pins.

19. A terminal junction assembly as defined in claim 18 including:

a junction box enclosing said interchangeable circuit means and having wall openings aligned with said terminal pins;

a housing containing said circuit means and having a cover which is removable to provide access to said circuit means for changing the programmed electrical connection of said plug pins; and wherein said projecting pins on said plug are insertable through said junction box wall openings into electrical contact with said terminal pins.

20. A programming plug for a flat cable wiring system, comprising:

a housing;

pins projecting externally from one wall of said housing;

circuit means within said housing electrically connecting selected pins; and, a cover on said housing which is removable to provide access to said circuit means for rearranging said circuit means to interconnect pins other than said selected pins.

* * * * *